April 28, 1964 H. P. HANNEKEN ETAL 3,130,499
GLASS CUTTING APPARATUS
Filed Oct. 5, 1960 2 Sheets-Sheet 2
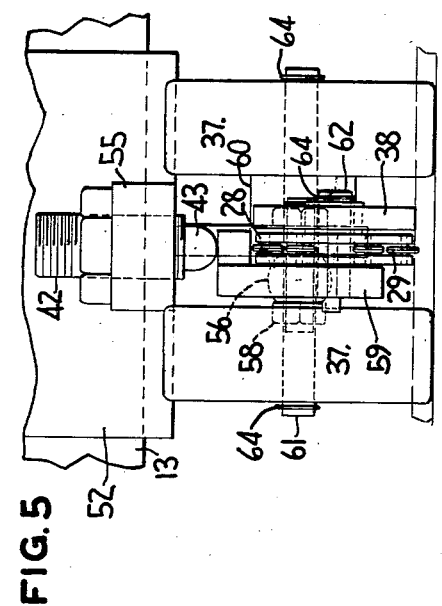
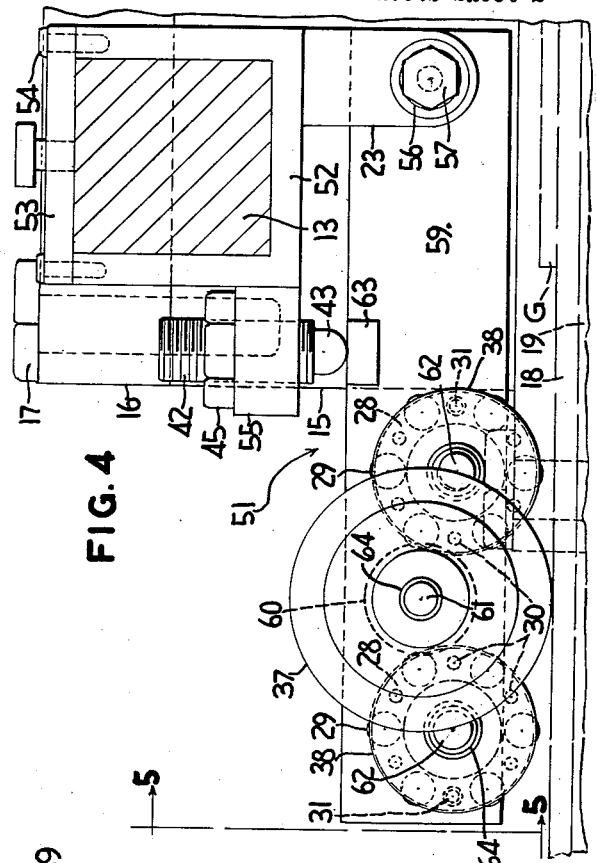
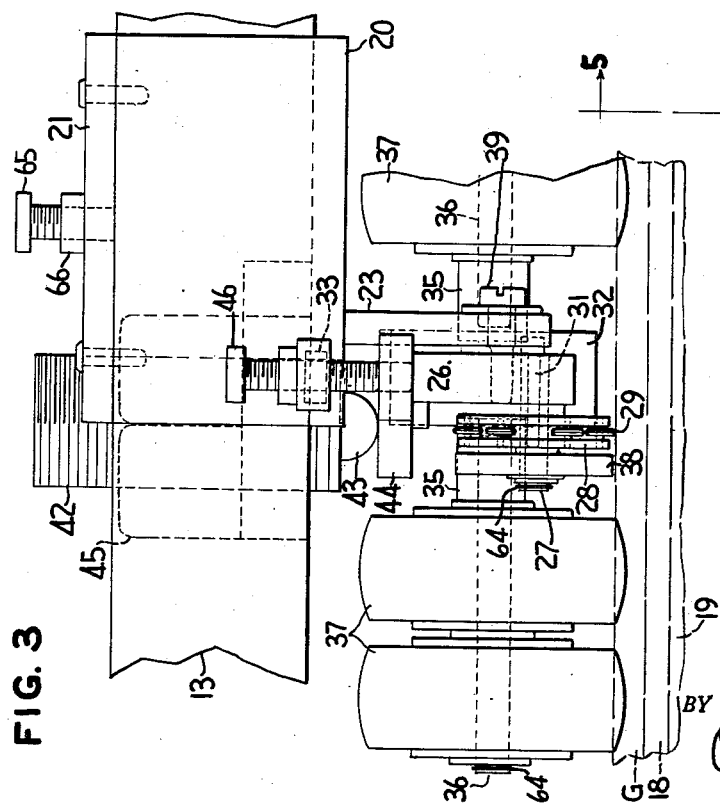
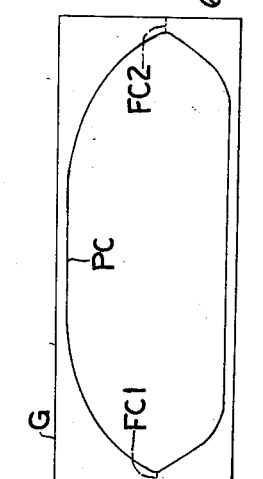
INVENTORS
HENRY P. HANNEKEN and
ORVILLE H. RINNE
BY Oscar L. Spencer
ATTORNEY

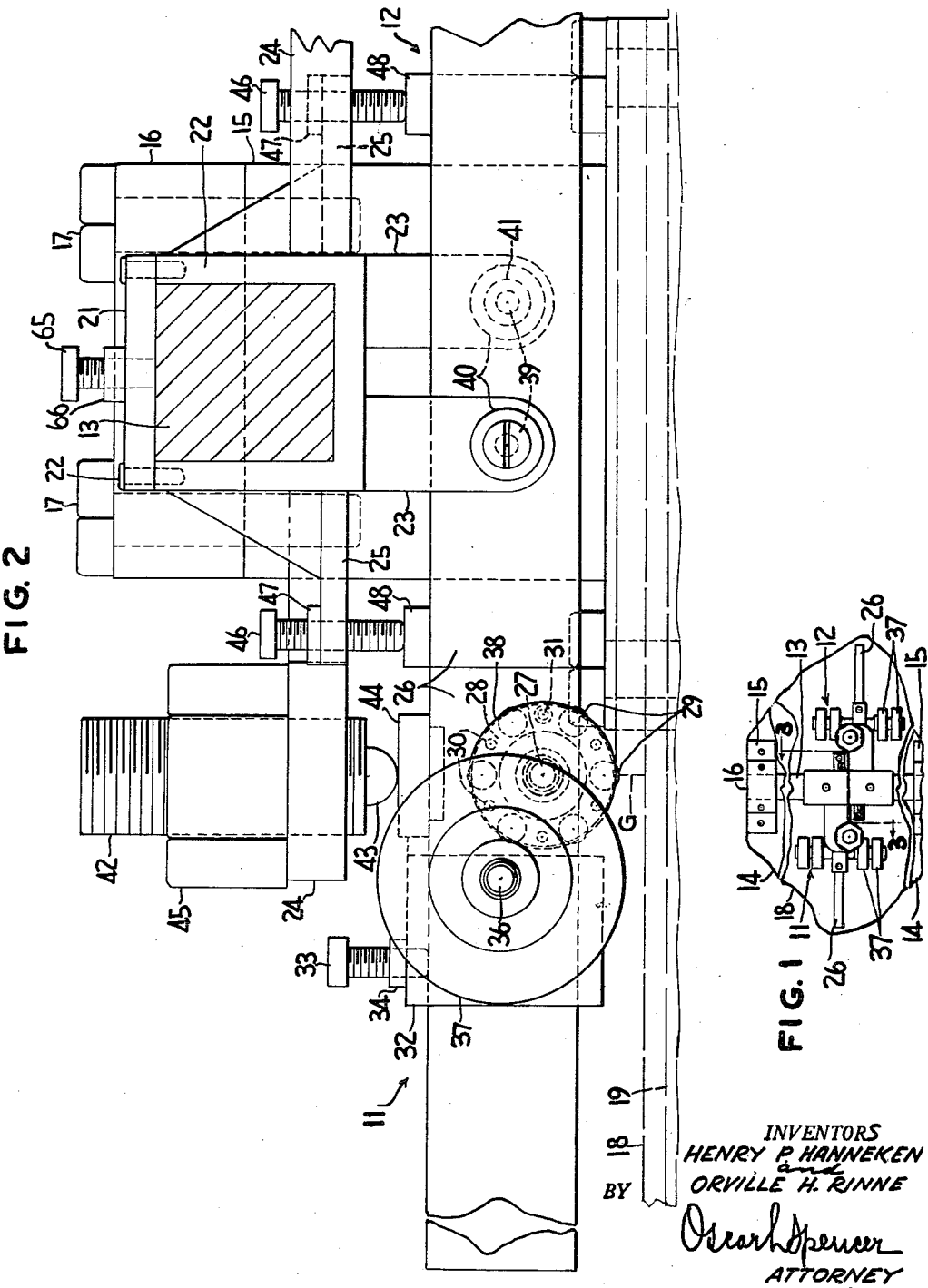

United States Patent Office 3,130,499
Patented Apr. 28, 1964

3,130,499
GLASS CUTTING APPARATUS
Henry P. Hanneken, Pittsburgh, Pa., and Orville H. Rinne, Crestline, Ohio, assignors to Pittsburgh Plate Glass Company, Pittsburgh, Pa., a corporation of Pennsylvania
Filed Oct. 5, 1960, Ser. No. 60,594
8 Claims. (Cl. 33—32)

This invention relates to a glass cutting apparatus and more especially relates to a cutter assembly which can provide a cut or score line on a glass sheet from an edge inwardly a predetermined distance toward or to the edge of a pattern score line.

In the manufacture of various articles of glass sheets, such as windshields and rear windows of automobiles, the articles have an outline other than rectangular. In the manufacture of these articles, it is conventional to cut a rectangular glass sheet by a glass scoring tool to provide an endless score line or pattern cut which is spaced from the edges of the rectangular sheet. In order to remove the pattern-cut glass sheet from the marginal portion of the rectangular glass sheet, it is customary to provide manually cut or score lines from opposite ends of the pattern cut to the adjacent edges of the rectangular sheet. These cuts, which are referred to as freeing cuts, are run and the pattern score is also run to remove the marginal portion of the rectangular sheet from the other portion cut to outline or pattern.

It is an object of the present invention to provide an apparatus to provide automatically a cut or score line from one edge of a glass sheet toward and to a pattern cut or score spaced entirely from the edges of the sheet.

It is another object of this invention to provide an apparatus that can automatically provide freeing cuts from the leading and trailing edges of a moving glass sheet to or adjacent a pattern score line.

These and other objects of the present invention will be apparent from the following description of preferred embodiments of the present invention when taken in conjunction with the drawings in which generally the same numerals are given for the same parts and in which:

FIG. 1 is a plan of a preferred embodiment of the apparatus;

FIG. 2 is an elevation of the apparatus with one of the bridge supports completely broken away;

FIG. 3 is a view taken along line 3—3 of FIG. 1;

FIG. 4 is a fragmentary elevation of a second preferred embodiment of the apparatus with one bridge support completely broken away;

FIG. 5 is a fragmentary elevation of the second embodiment as viewed along the line 5—5 of FIG. 4; and FIG. 6 is a glass sheet showing a pattern cut in the sheet and freeing cuts from opposite edges of the sheet to the pattern cut.

The apparatus of the present invention includes an arm, having a longitudinal axis and to be mounted for pivotal movement about an axis normal to the longitudinal axis, and a glass scoring tool having a scoring surface at a plane parallel to the longitudinal axis of the arm for scoring a glass sheet while providing relative movement between the scoring tool and the glass sheet in a direction normal to the pivotal axis of mounting of the arm. The apparatus also includes a wheel mounted on the arm for free rotation about an axis parallel to the pivotal axis of mounting of the arm. The wheel has a surface at a tangential plane parallel to the longitudinal axis of the arm. The tangential plane and parallel plane passing through the contacting surface of the scoring tool are on the same side of the longitudinal axis of the arm but the tangential plane is farther from the longitudinal axis than the scoring surface of the tool. Thus, the tangential plane is spaced from parallel planes passing through the tool and the parallel plane passing through the contacting surface of the tool passes through the wheel.

The apparatus of this invention includes means to support the glass sheet with a top major surface of the sheet at a horizontal plane and means to provide relative horizontal movement between the sheet and the tool. The means to support the glass sheet and the means to provide the relative movement may be provided by a conveyor, such as a belt conveyor, and in this instance the glass sheet is moved to provide the relative movement. A support is provided to pivotally mount the arm for movement about a horizontal axis in a vertical plane normal to the relative movement between the tool and the glass sheet. The apparatus includes means to limit the downward pivotal movement of the arm to a lower position and means to resist resiliently upward movement of the arm from this lower position. The scoring tool is mounted on the arm to position its scoring surface so that it will contact the glass sheet during the relative movement when the arm is in the lower position.

Referring to FIGS. 1–3, this embodiment of the apparatus includes a freeing cutter assembly generally indicated at 11, a freeing cutter assembly generally indicated at 12, and a bridge 13 which is mounted on a supporting structure 14 by U-shaped support brackets 15 on which the end portions of bridge 13 rest. The bridge 13, which is shown in the preferred embodiment as square in cross section, is held in U-shaped support brackets 15 by cover plates 16 which are secured to brackets 15 by bolts 17. The bridge 13 is spaced above and across a belt 18 of a belt conveyor. A plate 19 supports the top run of belt 18.

Each of freeing cutter assemblies 11 and 12 includes a U-shaped bracket or slide holder 20 which embraces the bottom and sides of bridge 13. The holder 20 is held in this position by means of a cap plate 21 and bolts 22 extending through plate 21 and into holder 20. Each holder 20 has an integral downwardly extending flange 23, an integral offset flange 24 extending from one side, and a flange 25 extending from the opposite side. The downwardly extending flange 23 of each support 20 pivotally supports an arm 26.

A pin 27 is press fit in a hole in each arm 26 and rotatably supports a turret holder 28 which has cutter wheels 29 mounted on it for free rotation about axes parallel to one another. These axes are the same radial distance from the axis of pin 27. Each turret holder 28 has holes 30 disposed the same radial distance from the axis of pin 27. Each arm 26 has an indexing pin 31 extending through a hole in arm 26 at this radial distance from pin 27. When pin 31 is removed from hole 30, turret holder 28 can be rotated about the axis of pin 27 to bring a different cutter wheel 29 into the lowermost position. The indexing pin 31 is returned to position to prevent rotation of turret holder 28.

A slide support 32 is slidably mounted on each arm 26. The support 32 is fixed in position by a screw 33 threaded in the top of support 32. The screw 33 can be turned to move it downwardly into abutment with the top surface of arm 26. The screw can be locked in this position at any point along arm 26 by a nut 34 on screw 33. The nut 34 is rotated until it abuts the top surface of support 32. The slidably support 32 has welded to it two horizontal hollow cylinders 35 in which are welded shafts or axles 36. A pair of rubber wheels 37 is journaled on each shaft 36.

The pin 27 also supports a rider wheel 38 for free rotation. The diameter of wheel 38 is slightly less than the circle containing the outermost points of wheels 29. The purpose of rider wheel 38, which is coaxial with the rotatable axis of turret holder 28, is to prevent gouging of the leading edge or trailing edge of sheet G. When the leading edge of sheet G approaches cutter wheel 29, the leading edge first contacts rider wheel 38 so that arm 28 pivots upwardly a slight amount and then cutter wheel 29 abuts the leading edge of sheet G. If rider wheel 38 were absent, the leading edge of sheet G would abut turret holder 28 before abutting cutter wheel 29. Because turret holder 28 is fixed by pin 31, there would be no rolling action and damage could ensue. Similarly, as cutter wheel 29 on turret holder 28 reaches the trailing edge of sheet G adjacent rider wheel 38 is moved downwardly onto sheet G, thereby preventing contact of turret holder 28 with sheet G. The only contact of the trailing edge of sheet G, other than cutter wheel 29, is contact with rider wheel 38.

A screw 39 extended through a horizontal hole in flange 23 is threaded into arm 26 and thus pivotally mounts arm 26 on flange 23. The head of screw 39 and flange 23 are separated by a spacer bushing 40 mounted on the shank of screw 39. The flange 23 and arm 26 are similarly separated by another spacer bushing 40. A sleeve bushing 41 separates the shank of screw 39 and flange 23.

The flange 24 has a threaded vertical hole through which extends a spring plunger 42 with an externally threaded housing. The plunger 42 has a downwardly facing head 43 which faces a flange 44 on arm 26. The plunger 42 is fixed in position by a lock nut 45 so that head 43 abuts flange 44 to resist resiliently upward movement of arm 26 on that side that supports wheel 37 and cutter turret 28. The plunger 42 is placed directly above the cutter wheel 29 that is in operative scoring position. The plunger is set to provide a resisting pressure, e.g., of 42 p.s.i.

The flange 25 has a threaded vertical hole. A screw 46 in this hole is turned until it abuts a flange 48 on arm 28 so that screw 46 limits the downward movement of the side of arm 26 which contains the cutter wheel 29 that is in the scoring position. This spaces wheel 29 from belt 18 and limits the depth of scoring. The lowermost position of wheel 37 to be abutted by a glass sheet G moving on belt 18 is also determined by the position of screw 46 which is locked in the position by a nut 47. Thus, screw 46 serves as a stop member to limit this pivotal movement of arm 26.

Referring to FIGS. 4 and 5, this embodiment of the apparatus has a freeing cutter assembly generally indicated at 51 instead of the two cutter assemblies 11 and 12 shown in FIGS. 1–3. The cutter assembly 51 includes bridge 13 mounted by supporting structure 14 as described above in connection with the first embodiment. The bridge 13 supports a slide holder 52 which is a U-shaped bracket that is fixed in position by cap plate 53 and bolts 54. The slide holder 52 includes a downwardly extending flange 23 and one horizontal flange 55. The flange 55 has a threaded vertical hole through which extends a spring plunger 42 which is fixed in vertical position by a nut 45.

The flange 23 of slide holder 52 has a horizontal hole in which is press fit a spherical bearing 56 which receives a screw 57 on which is mounted a nut 58. An arm 59 is pivotally mounted on flange 23 by being supported on the shank of screw 57 between nut 58 and flange 23. The arm 59 has a cylindrical boss 60 which has an axial bore in alignment with an aperture in the main part of arm 59. An axle 61 is press fit through boss 60 and through arm 59. The axle 61 rotatably supports a pair of wheels 37.

The arm 59 has two other horizontal holes which are on opposite sides of boss 60. Pins 62 are mounted in each of these two holes. Each pin 62 rotatably supports a rider wheel 38 and a turret cutter holder 28. Thus, this embodiment of the apparatus includes two cutter wheels 29 that are indexed in positions for scoring. These bottom extremities of cutter wheels 29 are in a horizontal plane above the horizontal plane tangential to the bottom of wheels 37. The arm 59 is urged downwardly by the pusher head 43 of spring plunger 42. The head 43 abuts a flange 63 of arm 59. The turret wheels 29 are fixed in position on pins 62 by indexing pins 31 in a similar manner to that described above for the first embodiment.

Retainer rings 64 on pins 27 and 62 hold turret holders 28 and rider wheels 38 on these pins. Retainer rings 64 on axles 36 and 61 hold wheels 37 on these axles.

The belt 18 has its top run moving along support 19 in a horizontal direction normal to the longitudinal axis of bridge 13 and parallel to the longitudinal axis of arms 26 (FIGS. 1–3) or parallel to arm 59 (FIGS. 4 and 5). Thus, the sheet G is scored by wheel 29 on each of arms 26 (FIGS. 1–3) or wheels 29 on arm 59 (FIGS. 4 and 5) in a direction parallel to the path of movement of sheet G.

Referring to FIG. 6, a glass sheet G is shown with a closed or pattern score line indicated by a full line PC. FIG. 6 also shows in dotted lines freeing cut lines FC1 and FC2 which extend from opposite edges of sheet G to the endless pattern score line PC.

For purposes of the description which follows, it is assumed that sheet G already has the pattern score line PC and is being moved by belt conveyor 18 from right to the left as viewed in FIGS. 2 and 4. The sheet G of FIG. 6 is placed on belt 18 as shown in FIG. 6 so that score line FC1 will extend from the leading edge of moving sheet G. In FIG. 2 wheels 37 of cutter assembly 12 are on sheet G and wheels 37 of cutter assembly 11 are in the path of sheet G. Sheet G has been moved to the point where cutter wheel 29 of cutter assembly 11 in scoring position is starting to score the leading edge of sheet G to obtain the freeing cut FC1. The freeing cut FC2 in sheet G has not yet been obtained. In FIG. 4 sheet G is being moved toward the cutter wheels 29 in scoring position and wheels 37. Neither of freeing cuts FC1 and FC2 has been produced in sheet G of FIG. 6.

In order to properly locate freeing score lines FC1 and FC2 on sheet G, slide holders 15 or slide holder 52 is moved along bridge 13 until cutter wheels 29 in scoring position are properly located. Then a screw 65 threaded in an opening of cap plate 21 is turned until the end of its shank tightly engages bridge 13. The latter position of screw 65 is fixed by rotating a nut 66 until it abuts the top of cap plate 21.

Referring to FIG. 2, glass sheet G being moved from right to left by belt 18 has its leading edge first abutting wheels 37 on arm 26 of cutter assembly 12. The leading edge of sheet G lifts wheels 37 thereby pivoting arm 26 of assembly 12 in a counterclockwise direction (as viewed in FIG. 2) to raise cutter wheel 29 so it is spaced above sheet G. The movement of sheet G continues until the leading edge abuts wheel 38 of cutter assembly 11. The wheel 38 rides up onto sheet G with a rolling action. This raises arm 26 of cutter assembly 11 slightly and prevents contact of the leading edge of sheet G with turret holder 28. Then the leading edge of sheet G abuts cutter wheel 29 of cutter assembly 11 to begin score line FC1 on sheet G. When the leading edge of sheet G reaches wheels 29, the latter with a rolling action ride up onto sheet G thereby lifting arm 26 of cutter assembly 11. This raises cutter wheel 29 out of contact with sheet G thereby discontinuing the production of score line FC1.

As the trailing edge of sheet G passes beyond the vertical plane through the axis of rotation of wheels 37 of cutter assembly 12, wheels 37 of assembly 12 ride down the trailing edge to lower cutter wheel 29 of cutter assembly 12 into scoring contact with sheet G to the left of the trailing edge of sheet G. With further movement of sheet G this contact of wheel 29 on sheet G produces score line FC2 to the training edge of sheet G. As cutter wheel 29 of cutter assembly 12 moves off the trailing edge of sheet G, arm 26 of assembly 12 lowers an additional slight amount to bring wheel 38 of assembly 12 into rolling contact with the trailing edge of sheet G until the trailing edge passes beyond wheel 38 of cutter assembly 12.

By changing the location of slide support 32 of cutter assembly 11, it is apparent that the length of freeing cut FC1 from the leading edge of sheet G can be changed. Similarly, by changing the location of slide support 32 on arm 26 of cutter assembly 12, the length of freeing cut FC2 on sheet G from the trailing edge can be changed.

Referring to FIG. 4, the moving sheet G on belt 18 first has its leading edge abut wheel 38. The rolling contact of wheel 38 raises arm 59 slightly. The further movement of sheet G brings the leading edge into contact with wheel 29 of turret holder 28 between wheels 37 and screw 57 to start score line FC1. When the leading edge of moving sheet G abuts wheels 37, the latter rolls up onto sheet G thereby lifting arm 59 to raise cutter wheel 29 to the right of wheels 37 and that has been producing score line FC1. The wheel 29 is lifted completely out of contact with sheet G so that line FC1 ends.

The moving sheet G continues its movement under now rolling wheels 37. Because arm 59 is in the raised position wheel 29 at the bottom position on holder 28 to the left (as viewed in FIG. 4) of wheels 37 is also spaced above sheet G so that it cannot produce a score line as sheet G starts to pass under it. When sheet G passes beyond the vertical plane at the axis of pin 61, wheels 37 ride down the trailing edge of sheet G. This results in the lowering of arm 59 to bring cutting wheel 29 to the left of wheels 37 into scoring contact with sheet G. This starts the freeing score line FC2. The scoring continues until this cutter wheel 29 rides off the trailing edge of sheet G. At this time arm 59 lowers a slight amount to bring associated wheel 38 into rolling contact with the trailing edge of sheet G. The wheel 38 rolls off the trailing edge of sheet G and prevents contact of the associated turret tolder 28 with the trailing edge of sheet G. The length of score lines FC1 and FC2 are determined by the distances between the vertical transverse plane that contains the axis of pin 61 and the vertical transverse planes that contain the axis of cutter wheel 29 in scoring position on turret holder 28 to the right of wheels 37 (for score line FC1) and the transverse vertical plane containing the axis of rotation of cutter wheel 29 in scoring position of turret holder 28 to the left of wheels 37 (for score line FC2).

The foregoing description of preferred embodiments of the present invention have been presented solely for purpose of illustration. Various modifications will be apparent to one skilled in the art from this description. For example, each turret holder 28 in FIG. 4 can be mounted on arm 58 for adjustable movement to the left or right to change the length of score lines FC1 and FC2. Also wheels 37 in the embodiment of FIG. 4 can be mounted on arm 59 for adjustable movement to the left or right, as in the case of wheels 37 mounted on arm 26 of cutter assemblies 11 and 12. Also the cutter assemblies 11 and 12 of FIG. 2 can be modified by mounting turret holder 28 for adjustment to the left or right in the same manner that wheels 37 are adjustably movable by mounting on slide holders 32. In this modification the axis of rotation of wheels 37 of each of cutter assemblies 11 can be fixed, if desired. Instead of turret holders to rotatably mount cutter wheels, individual cutter wheels can be used; this would eliminate the convenience of rapid replacement of a cutter wheel from the scoring position. In addition, instead of cutter wheels diamond scoring tools can be substituted.

The present invention is limited only by the claims which follow.

We claim:

1. An apparatus for cutting a glass sheet from an edge toward an opposite edge of a glass sheet but for a distance less than the distance between the opposite edges comprising an arm having a longitudinal axis and to be mounted for pivotal movement about an axis normal to the longitudinal axis, a glass scoring tool on said arm and having a scoring surface at a plane spaced from and parallel to the longitudinal axis of said arm, and a wheel mounted on the arm for free rotation about an axis parallel to the pivotal axis of mounting of said arm and normal to the longitudinal axis of said arm, said wheel having a surface at a tangential plane parallel to the longitudinal axis of said arm, said tangential plane and a parallel plane passing through the contacting surface of said tool being on the same side of the longitudinal axis of said arm and said tangential plane being at all times farther from the longitudinal axis than the parallel plane passing through the scoring surface of said tool.

2. An apparatus for cutting a glass sheet from an edge toward an opposite edge of a glass sheet but for a distance less than the distance between the opposite edges comprising a support, a glass scoring tool having a glass scoring surface, means to support a glass sheet with a top major surface of the sheet at a horizontal plane, means to provide relative horizontal movement between the sheet and the tool, an arm pivotally mounted on said support for movement about a horizontal axis in a vertical plane normal to the relative movement, means adjacent to said arm to limit the downward pivotal movement of said arm to a lower position, means adjacent to said arm to resist resiliently upward movement of said arm from the lower position, said scoring tool being mounted on said arm to position said scoring surface in the path of travel of the glass sheet with said arm in the lower position, a wheel mounted on said arm for free rotational movement about a horizontal axis in a vertical plane parallel to the vertical plane including the pivotal axis of said arm, said scoring surface of said scoring tool being in a vertical parallel plane between the vertical parallel planes through said wheel and said pivotal axis of said arm and said wheel having a lower contacting surface at a horizontal plane tangential to said wheel below a horizontal plane through the glass scoring surface of said tool with said arm in the lower position.

3. An apparatus for cutting a glass sheet from an edge toward an opposite edge of a glass sheet but for a distance less than the distance between the opposite edges comprising a support, a glass scoring tool having a glass scoring surface, means to support a glass sheet with a top major surface of the sheet at a horizontal plane, means to convey the glass sheet in a horizontal path, an arm pivotally mounted on said support for movement about a horizontal axis in a vertical plane normal to the path of movement of the glass sheet provided by said conveying means, means adjacent said arm to limit the downward pivotal movement of said arm to a lower position, means adjacent said arm to resist resiliently upward movement of said arm from the lower position, said scoring tool being mounted on said arm to position said scoring surface in the path of travel of the glass sheet with said arm in the lower position, a wheel mounted on said arm for free rotation of movement about a horizontal axis in a vertical plane parallel to the vertical plane including the pivotal axis of said arm, said scoring surface of said scoring tool being in a vertical parallel plane between the vertical parallel planes through said wheel and said pivotal axis of said arm and said wheel having a lower contacting surface at a horizontal plane tangential to said wheel below a horizontal plane through the glass scoring surface of said tool with said arm in the lower position.

4. An apparatus for cutting a glass sheet from an edge toward an opposite edge of a glass sheet but for a distance less than the distance between the opposite edges comprising a conveyor to move a glass sheet in a horizontal path, a supporting structure, a bridge mounted on said supporting structure and extending above said conveyor in a direction normal to the path of travel of the sheet provided by said conveyor, a support mounted on said bridge and having a downwardly extending flange and a pair of horizontal flanges extending in opposite directions parallel to the path of travel provided by said conveyor, and a cutter assembly including an arm pivotally mounted on said downwardly extending flange for movement about a horizontal axis normal to the travel of the glass sheet provided by said conveyor, wheels mounted on said arm for rotation about a common axis parallel to the pivotal axis of said arm, a turret holder rotatably mounted about an axis between the axis of rotation of said wheels and the pivotal axis of said arm, cutter wheels rotatably mounted on the turret holder, means to index the turret holder to position one of said cutter wheels at a lowermost position for said cutter wheels, said turret holder being positioned so that a horizontal plane tangential to the bottom of said lowermost cutter wheel passes through said wheels having a common axis and with the horizontal plane tangential to the bottom of said wheels having a common axis spaced below said cutter at the lowermost position, a spring plunger mounted on one of said horizontal flanges directly above said lowermost cutter wheel and abutting said arm, and an adjustable stop member mounted on the other horizontal flange and abutting said arm.

5. The apparatus of claim 4 and further including a second support having a downwardly extending flange and a pair of horizontal flanges extending in opposite directions parallel to the path of travel provided by said conveyor, corresponding horizontal flanges of the two supports being on opposite sides of the bridge and a second cutter assembly including an arm pivotally mounted on said downwardly extending flange of said second support for movement about a horizontal axis normal to the travel of the glass sheet provided by said conveyor, wheels mounted on said last-mentioned arm for rotation about a common axis parallel to the pivotal axis of said arm, a turret holder rotatably mounted about an axis between the axis of rotation of said wheels and the pivotal axis of said arm, cutter wheels rotatably mounted on the turret holder, means to index the turret holder to position one of said cutter wheels at a lowermost position for said cutter wheels, said turret holder being positioned so that a horizontal plane tangential to the bottom of said lowermost cutter wheel passes through said wheels having a common axis and with the horizontal plane tangential to the bottom of said wheel having a common axis being spaced below said cutter at the lowermost position, a spring plunger mounted on one of said horizontal flanges directly above said lowermost cutter wheel and abutting said arm, and an adjustable stop member mounted on the other horizontal flange and abutting said arm, said second cutter assembly being mounted on said bridge to place the wheels with the common axis and turret cutter holder of the second cutter assembly and the wheels with the common axis and the turret holder of the first-mentioned cutter assembly on opposite sides of the transverse vertical plane passing through said bridge, whereby the apparatus can provide freeing cuts from leading and trailing edges of a moving glass sheet.

6. The apparatus of claim 5 wherein each of said cutter assemblies includes a support slideably mounted on said arm of each assembly for adjustable positioning of said slideable support along the longitudinal axis of said arm and said slideable supports mount said wheels on said arms for rotation about common axes parallel to the pivotal axes of said arms.

7. An apparatus for cutting a glass sheet from an edge toward an opposite edge of a glass sheet but for a distance less than the distance between the opposite edges comprising a conveyor to move a glass sheet in a horizontal path, a supporting structure, a bridge mounted on said supporting structure and extending above said conveyor in a direction normal to the path of travel of the sheet provided by said conveyor, a support mounted on said bridge and having a downwardly extending flange and a horizontal flange, an arm pivotally mounted on said downwardly extending flange for movement about a horizontal axis normal to the travel of the glass sheet provided by said conveyor, wheels mounted on said arm for rotation about a common axis parallel to the pivotal axis of arm, glass cutter tools mounted on said arm at vertical transverse planes on opposite sides of a vertical transverse plane in which the common axis of rotation of said wheels is located, each of said scoring tools having a lowermost glass-scoring surface, and a spring plunger mounted on said horizontal flange and abutting said arm to resist resiliently upward movement of said arm, said glass-scoring surfaces of said tools being at a horizontal plane passing through said wheel and a horizontal plane tangential to the lowermost surface of said wheels being spaced below said glass-scoring surfaces of said tool.

8. Apparatus for cutting or scoring on a moving sheet of glass a line of predetermined length from an edge of said sheet which extends transversely of the direction of sheet movement which comprises an arm pivoted on a support about an axis transverse to the direction of sheet movement, a scoring tool on said arm spaced from the pivotal axis thereof, and at least one wheel rotatably mounted on said arm about an axis parallel to the pivotal axis of said arm and adjacent to but longitudinally spaced from said scoring tool, said wheel being so constructed and arranged and of sufficient external radius that when it rides on a major surface of the glass sheet said scoring tool is maintained in spaced relation to said surface.

References Cited in the file of this patent
UNITED STATES PATENTS

| | | |
|---|---|---|
| 1,702,522 | Owen | Feb. 19, 1929 |
| 1,855,078 | Williamson | Apr. 19, 1932 |
| 1,970,930 | Brasseur et al. | Aug. 21, 1934 |